(12) United States Patent
Shuster et al.

(10) Patent No.: US 7,013,716 B1
(45) Date of Patent: Mar. 21, 2006

(54) METHOD AND APPARATUS FOR MEASURING, ANALYZING, AND CHARACTERIZING IRREGULARITIES ON A SURFACE OF AN ARTICLE

(75) Inventors: Mark Shuster, Houston, TX (US); Donald K. Cohen, Farmington Hills, MI (US); Dana M. Combs, Maumee, OH (US); Ralph W. Larson, Olivet, MI (US); Robert R. Binoniemi, Sturgis, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/207,401

(22) Filed: Jul. 29, 2002

Related U.S. Application Data

(60) Provisional application No. 60/308,509, filed on Jul. 28, 2001.

(51) Int. Cl.
*G01N 19/00* (2006.01)
(52) U.S. Cl. ...................................................... 73/104
(58) Field of Classification Search ................. 73/104, 73/105, 38; 250/306, 307; 702/170; 253/307; 356/600
See application file for complete search history.

(56) References Cited

U.S. PATENT DOCUMENTS

| | | | | |
|---|---|---|---|---|
| 3,699,821 A | * | 10/1972 | Hahn ........................... | 73/104 |
| 4,577,494 A | | 3/1986 | Jaeggi | |
| 5,361,308 A | | 11/1994 | Lee et al. | |
| 5,565,623 A | | 10/1996 | Philpott et al. | |
| 5,625,575 A | * | 4/1997 | Goyal et al. .................... | 703/6 |
| 6,034,778 A | * | 3/2000 | Shin et al. .................. | 356/600 |
| 6,453,263 B1 | * | 9/2002 | Sirtori et al. ................ | 702/170 |

OTHER PUBLICATIONS

"Interferometer Helps Produce Reliable Touchpad Films", Ruth A. Mendonsa, Photonics Spectra magazine, May, 1997.
"Wear Measurement", A.W Ruff, ASTM Friction And Wear Testing Source Book, pp. 22-29, 1997.

(Continued)

*Primary Examiner*—Michael Cygan
(74) *Attorney, Agent, or Firm*—MacMillan, Sobanski & Todd, LLC

(57) ABSTRACT

A surface capacity parameter is determined for a surface of an article having irregularities therein that can be characterized by peaks and valleys relative to a reference point. Initially, an area of interest on the surface of the article and a lateral resolution of that area of interest are determined. An apparatus generates a visual representation of the area of interest on the surface of the article. A deflection contact part factor for the article is calculated, and a bearing ratio curve level is determined based upon the calculated deflection contact part factor and the magnitude of the height or distance between the tallest peak and the lowest valley on the surface of the article. The volume of the material comprising the peaks in the surface of the article and the volume of the space in the surface of the article that is available for the retention of a fluid, such as a lubricant, are determined. Lastly, a surface capacity parameter is calculated as the ratio of the volume of the material comprising the peaks in the surface of the article to the volume of the volume of the space comprising the valleys in the surface of the article.

5 Claims, 11 Drawing Sheets

OTHER PUBLICATIONS

"Surface Topography And Noise Emission In Gearboxes", Naser Amini et al., Proceedings Of The DETC, pp. 1-7, 1997.

"Optimization Of Gear Tooth Surfaces", Naser Amini et al., Proceedings Of The 7th International Conference Of Metrology And Properties Of Engineering Surfaces, vol. 1, pp. 6-16, 1997.

"Optimal Surface Topography For Noise Suppression In Gears", Naser Amini, Licentiate Thesis, Chalmers University Of Technology, 1997.

* cited by examiner

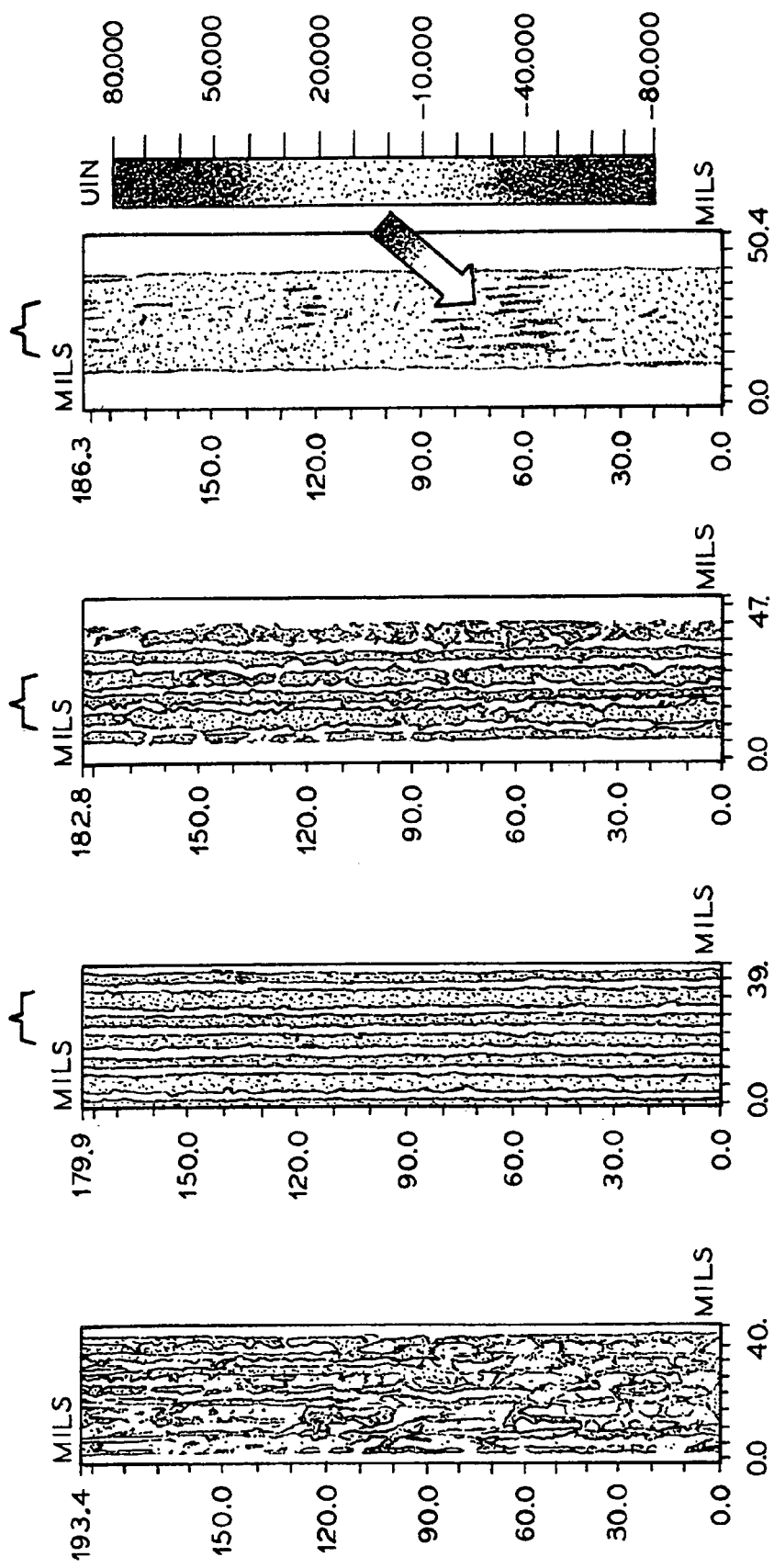

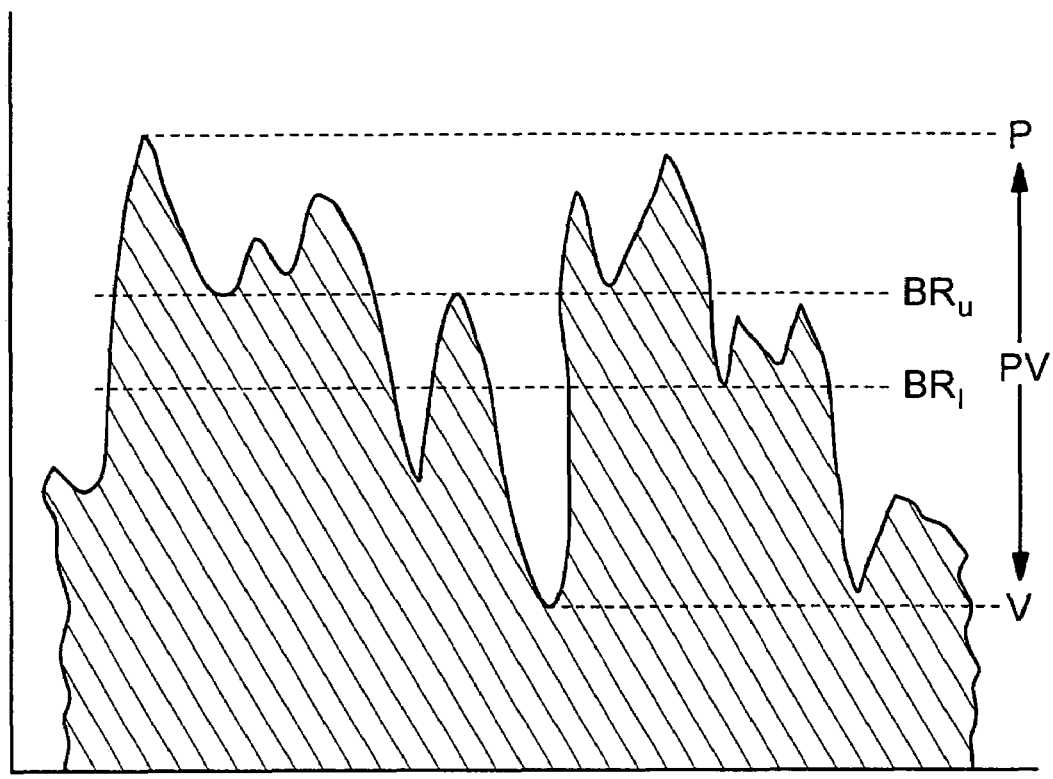
F I G. 16

METHOD AND APPARATUS FOR MEASURING, ANALYZING, AND CHARACTERIZING IRREGULARITIES ON A SURFACE OF AN ARTICLE

CROSS REFERENCE TO RELATED APPLICATION

This application claims the benefit of U.S. Provisional Application No. 60/308,509, filed Jul. 28, 2001, the disclosure of which is incorporated herein by reference.

BACKGROUND OF THE INVENTION

This invention relates in general to methods and apparatuses for gathering and interpreting data regarding the amount of roughness that is present on a surface of an article. In particular, this invention relates to an improved method and apparatus for measuring, analyzing, and characterizing irregularities that are present on the outer surface of an article for the purpose of generating better quality information for various engineering and other uses.

A wide variety of mechanical structures are known in the art that employ two or more components that abut or otherwise engage one another in some manner during use. For example, annular seal assemblies are well known structures that include a flexible sealing element that slidably engages an outer surface of a rotatable shaft so as to prevent a fluid (such as oil) from passing therethrough when the shaft is rotated during use. Bearings are also well known structures that include one or more bearing elements, such as cylindrical roller bearings, that slidably or rotatably engage an outer surface of a rotatable member. Also, gears are well known structures that include respectively pluralities of teeth that mesh with one another to effect concurrent rotation.

In each of these and in other mechanical structures, the outer surfaces of the components engage and cooperate with one another in some manner during use. In many instances, the relative smoothness or roughness of either or both of the outer surfaces of the components can be very important in determining whether the mechanical structure will function efficiently or, in some cases, function at all. For example, in an annular seal assembly, it has been found desirable for the outer circumferential surface of the rotatable shaft to have a variety of relatively small irregularities formed therein. The presence of some of such irregularities has been found to be desirable because they provide small recesses that can retain fluid therein, which functions as a lubricant to minimize the adverse effects of friction and heat that would otherwise be generated at the sealing element when the shaft is rotated during use. So long as the irregularities are relatively small in size and sufficiently randomly distributed over the outer circumferential surface of the shaft, then their presence will not likely affect the operation of the annular seal assembly. In other mechanical structures, however, it may be desirable to have a different surface configuration for the components that engage one another. The particular surface configuration for such components will vary from application to application in accordance with many factors, including material composition, manner of engagement, load magnitude, and other engineering considerations.

Unfortunately, the size and orientation of the irregularities formed in the outer surfaces of the components are so small as to be not visible to the naked eye or otherwise readily ascertainable. To overcome this, a variety of devices have been developed that can gather raw data regarding the relative smoothness or roughness of the surface of an article. Many of these devices are capable of presenting the gathered raw data in either a qualitative format (such as in a visual two-dimensional or three-dimensional representation) or in a quantitative format (such as in a mathematical representation). Although interesting in some instances and for some purposes, the usefulness of these qualitative and quantitative representations of the raw data is somewhat limited.

To improve the characterization of the surface of an article, it is known to initially measure the size and orientation of the irregularities formed therein, then to perform one or more mathematical operations to derive a parameter that is indicative of such irregularities. A variety of roughness parameters have been established over the years. For example, an arithmetic average roughness parameter (commonly referred to as $R_a$) and a root mean square roughness parameter (commonly referred to as $R_q$) are well known in the art. However, it has been found that these and other parameters that are known in the art do not provide a sufficient amount of information to be useful in certain engineering and other uses. Specifically, it has been found that these and other known parameters cannot, at least in some instances, sufficiently characterize the surface of the article so as to clearly distinguish between differing surface textures that can adversely affect the operation of the mechanical structure. Thus, it would be desirable to provide an improved method and apparatus for measuring, analyzing, and characterizing irregularities that are present on the outer surface of an article for the purpose of generating better quality information for various engineering and other uses.

SUMMARY OF THE INVENTION

This invention relates to an improved method and apparatus for measuring, analyzing, and characterizing irregularities that are present on the outer surface of an article for the purpose of generating better quality information for various engineering and other uses.

An apparatus, such as an interferometric measuring device, is used to obtain qualitative information regarding a first portion of the outer circumferential surface of the shaft. That qualitative information can be used to generate a two dimensional or three dimensional visual representation of a first portion of the outer circumferential surface of the shaft. Then, the shaft is rotated by a predetermined amount, and the apparatus is again used to generate a visual representation of a second portion of the outer circumferential surface of the shaft. This process is repeated as necessary to obtain a plurality of visual representations that together span across a predetermined amount, fifteen degrees, for example, of the outer circumferential surface of the shaft. The size of this circumferential span may be selected as desired. Preferably, these images cover both the worn and non-worn surfaces of the shaft. Following this acquisition, the plurality of visual representations are processed by an image processor so as to generate a single comprehensive enlarged visual representation of a relatively large surface area of the outer circumferential surface of the shaft. The enlarged visual representation is preferably shaded, colored, or otherwise highlighted to illustrate the irregularities that are formed in the relatively large surface area of the outer circumferential surface of the shaft. The single comprehensive enlarged visual representation can be analyzed to determine whether such irregularities create a preferential lead when the shaft is rotated during use and, if so, in which direction such preferential lead is oriented. If the amount of wear is clearly visible, the single comprehensive enlarged visual representation can be analyzed by sight. Alternatively, the single comprehensive enlarged visual representation can be analyzed by computer software, such as by measurement of the normalized volume of the surface.

This invention also relates to an improved method for characterizing the outer circumferential surface of a rotatable shaft that is adapted to be sealingly engaged by an annular lip seal. Ideally, the outer circumferential surface of the shaft should have a texture that provides adequate volume to entrap lubricant so as to provide lubricity and sufficient surface peaks to uniformly support the inner surface of the annular lip seal and prevent leakage therethrough. It has been found that if the outer circumferential surface has too few peaks, the engagement of the seal may result in high contact loads, resulting in premature wear. Using the three dimensional surface measurement techniques, a new parameter has been established for characterizing the outer circumferential surface of the shaft. This new parameter, which is referred to as the surface capacity (SC) parameter, represents the ratio of the volume of material comprising the peaks to the volume available for lubricant retention. This parameter can be determined by (1) producing a three dimensional measurement of the outer circumferential surface of the shaft, (2) calculating the absolute volume of the lubricant that can be supported on the outer circumferential surface of the shaft, (3) starting from the highest point of the outer circumferential surface, establishing a percentage of the measured surface that comprises the expected peaks thereof, (4) evaluating the volume of material that comprises the selected peak region, and (5) calculating the parameter ratio.

It is well known that very small amounts of wear are very difficult to accurately measure. This new method for wear evaluation allows for tribological (i.e., study that deals with the design, friction, wear, and lubrication of interacting surfaces in relative motion, as in bearings or gears) evaluation of the efficiency of any material, coating, method of hardening, etc.

Various objects and advantages of this invention will become apparent to those skilled in the art from the following detailed description of the preferred embodiments, when read in light of the accompanying drawings.

BRIEF DESCRIPTION OF THE DRAWINGS

FIG. 8 is a comprehensive visual representation of the shaft illustrated in FIG. 1 after being subjected to a first rough turning process.

FIG. 9 is a comprehensive visual representation of the shaft illustrated in FIG. 1 after being subjected to a second finish turning process.

FIG. 10 is a comprehensive visual representation of the shaft illustrated in FIG. 1 after being subjected to a third quenching process.

FIG. 11 is a comprehensive visual representation of the shaft illustrated in FIG. 1 after being subjected to a fourth finish plunge grinding process.

FIG. 16 is a graph similar to FIG. 15 that illustrates in two dimensional form the irregularities present on a portion of the surface of an article and a pair of bearing ratio curve level lines that represent upper and lower thresholds for calculating the surface capacity parameter.

DETAILED DESCRIPTION OF THE PREFERRED EMBODIMENTS

Figure 1:
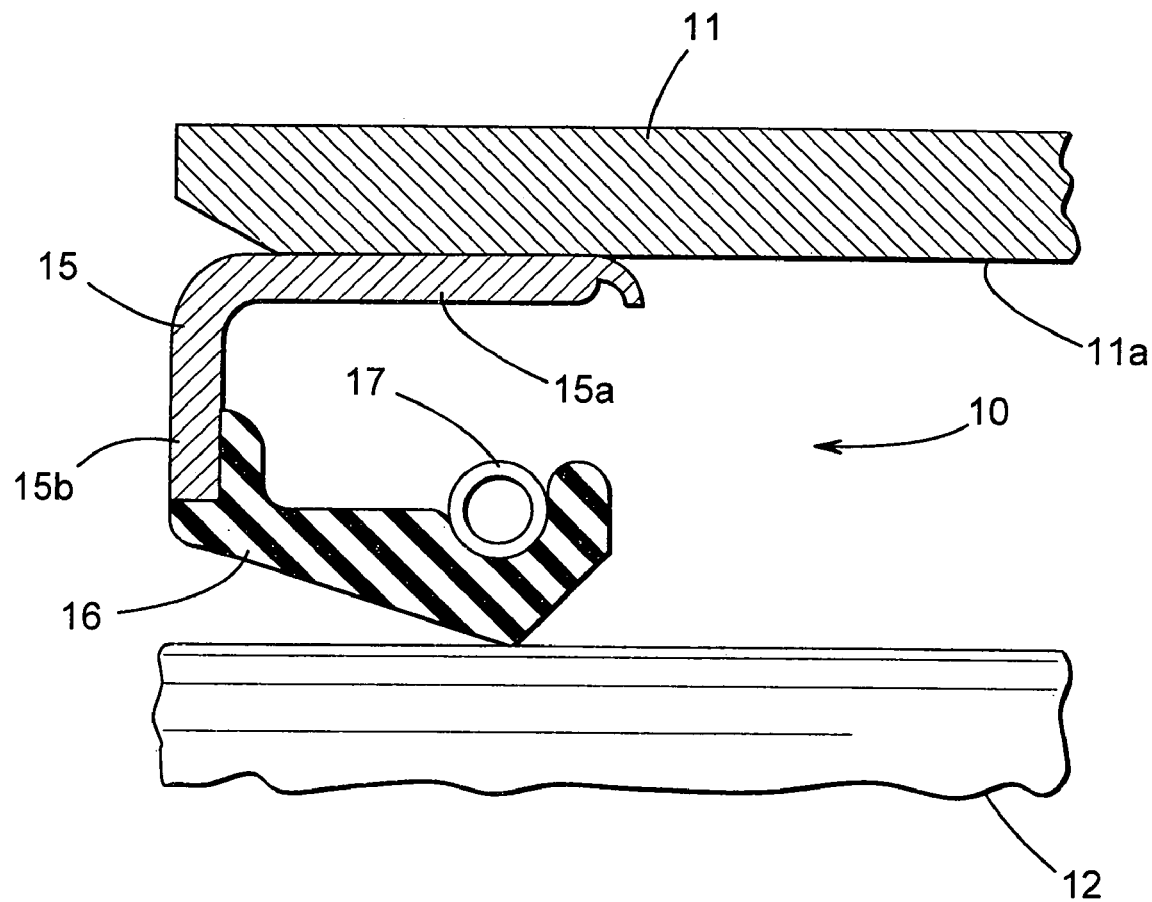
FIG. 1 is a sectional elevational view of a portion of a conventional radial lip seal assembly disposed within an opening formed through a housing and about a rotatable cylindrical shaft.

Referring now to the drawings, there is illustrated in FIG. 1 a conventional structure for a radial lip seal assembly, indicated generally at 10, for providing a seal between a housing 11 and a rotatable shaft 12. Although this invention will be described in the context of the illustrated radial lip seal assembly 10, it will be appreciated that this invention can be practiced in connection with the measuring, analyzing, and characterizing of irregularities that are present on any surface of any type of article.

The housing 11 is intended to be representative of any machine or mechanism having an opening 11a through which at least a portion of the shaft 12 extends and is rotated relative thereto during use. The radial lip seal assembly 10 includes an outer annular case 15 that is typically formed from a metallic or otherwise rigid material. In the illustrated embodiment, the case 15 is generally L-shaped in cross section, having an axially extending portion 15a and a radially extending portion 15b. However, the case 15 may be formed having any desired shape or configuration. The outer diameter defined by the axially extending portion 15a of the case 15 is usually sized to be slightly larger that the inner diameter defined by the opening 11a such that the case 15 can be installed within the opening 11a formed through the housing 11 in a press fit relationship. The radially extending portion 15b of the case 15 extends radially inwardly from the axially extending portion 15a and terminates at a location that is spaced apart from the outer circumferential surface of the shaft 12.

The radial lip seal assembly 10 also includes an annular sealing element 16 that is usually secured to the radially extending portion 15b of the case 15, such as by an adhesive. The sealing element 16 is typically formed from a flexible material, such as an elastomeric material, and includes a portion that extends radially inwardly into engagement with the outer circumferential surface of the shaft 12. If desired, an annular garter spring 17 or other biasing mechanism can be provided to positively urge the portion of the sealing element 16 radially inwardly into engagement with the outer circumferential surface of the shaft 12.

The radial lip seal assembly 10 is designed to prevent a fluid (such as oil) from passing axially therethrough from one side thereof (typically the right side when viewing FIG. 1) to the other side thereof (typically the left side when viewing FIG. 1) as the shaft 12 is rotated during use. To accomplish this, the radially inwardly extending portion of the sealing element 16 engages the outer circumferential surface of the shaft 12. As discussed above, the outer circumferential surface of the shaft 12 is preferably not perfectly smooth in shape, but rather has a variety of irregularities formed therein. Such irregularities can, when the shaft 12 is rotated, function to provide a preferential lead that can either advantageously or adversely affect the performance of the radial lip seal assembly 10, depending upon orientation of the shaft 12 relative to the radial lip seal assembly 10.

Figure 2:
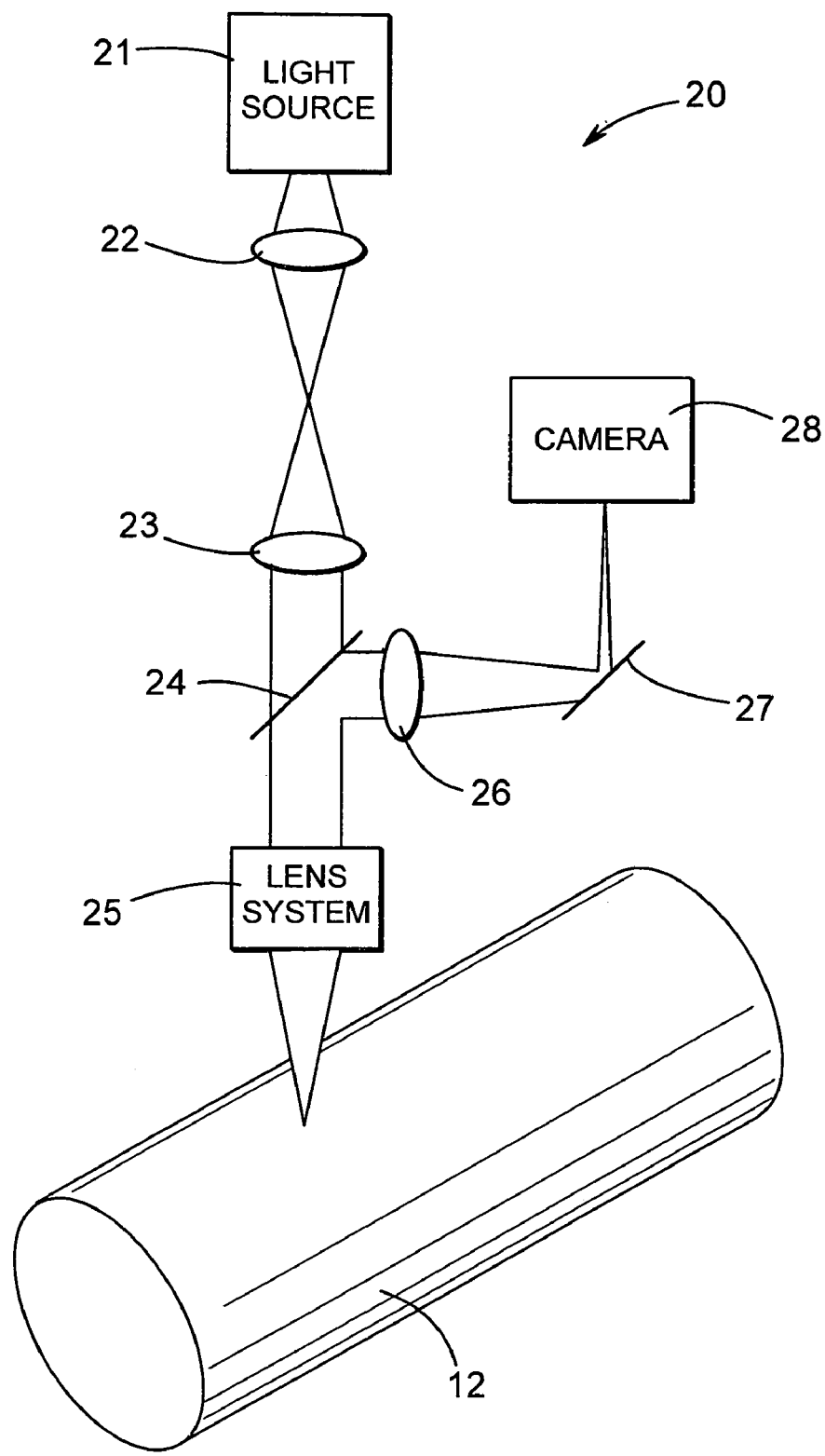
FIG. 2 is a schematic diagram of a first embodiment of an apparatus for generating an enlarged visual representation of a single relatively small area of the outer circumferential surface of the shaft illustrated in FIG. 1.

FIG. 2 schematically illustrates the structure of a first embodiment of an apparatus, indicated generally at 20, for generating an enlarged visual representation of a single relatively small area of the outer circumferential surface of the shaft 12 illustrated in FIG. 1. In the illustrated embodiment, the apparatus 20 is an interferometric measuring device that is designed to generate a quantitative analysis (i.e., a mathematical representation) of the single relatively small area of the outer circumferential surface of the shaft 12. Such an interferometric measuring device is disclosed in U.S. Pat. No. 5,355,221 to Cohen et al., the disclosure of which is incorporated herein by reference. Briefly, however, such apparatus 20 includes a light source 21 that generates a beam of light through a pair of aligning lenses 22 and 23, a beam splitter 24, and an interferometric lens system 25 onto a relatively small area of the outer circumferential surface of the shaft 12. The beam of light is reflected from the illuminated relatively small area of the outer circumferential surface of the shaft 12 back to the beam splitter 24, where it is reflected through a lens 26 and a mirror 27 into a camera 28. The camera 28 generates a mathematical representation of the illuminated portion of the outer circumferential surface of the shaft 12 which can be used to generate a visual representation thereof, typically in digital signal form.

The structure and operation of the apparatus 20 is conventional in the art and, therefore, requires no detailed explanation. Although this invention will be described in the context of the illustrated apparatus 20, it will be appreciated that this invention may be practiced using any device that is capable of generating a quantitative or qualitative analysis and/or an enlarged visual representation of a portion of the outer circumferential surface of the shaft 12. A variety of interference microscopes and similar optical profilers are available from the Wyko Optical Profilers Group of Veeco Instruments Inc. in Tucson, Ariz.

Figure 3:
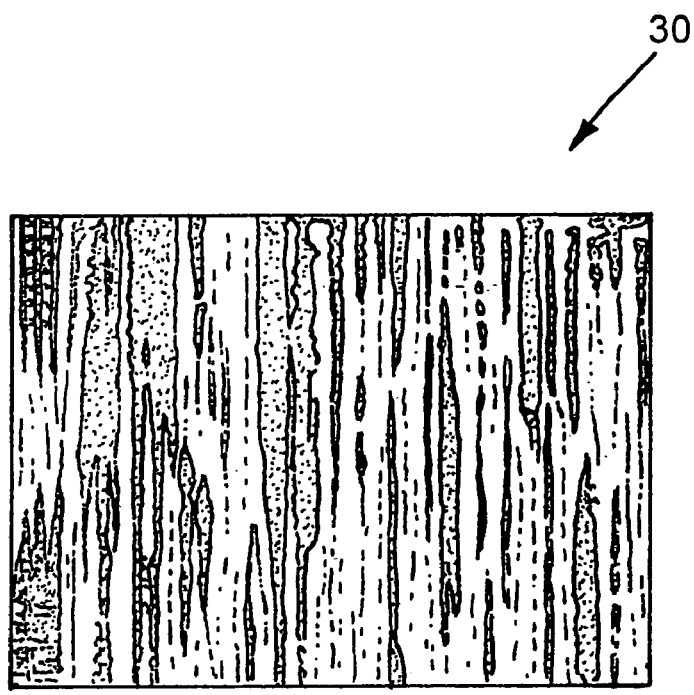
FIG. 3 is an enlarged two dimensional visual representation generated by the apparatus illustrated in FIG. 2 of the single relatively small area of the outer circumferential surface of the shaft illustrated in FIG. 1.
Figure 4:
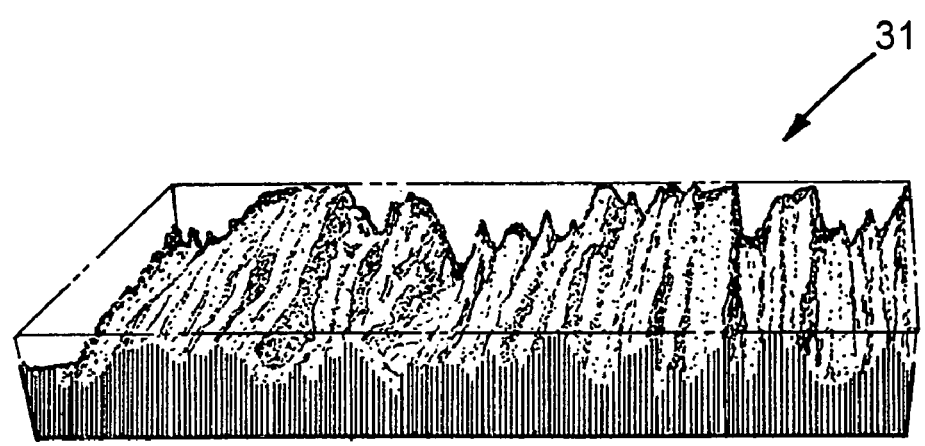
FIG. 4 is an enlarged three dimensional visual representation generated by the apparatus illustrated in FIG. 2 of the single relatively small area of the outer circumferential surface of the shaft illustrated in FIG. 1.

The visual representation generated by the camera 28 can be stored in a conventional electronic controller (not shown) and processed for visual display, such as on a video terminal or in hard copy form. Samples of the enlarged visual representations that can be generated by the apparatus 20 are illustrated in FIGS. 3 and 4. FIG. 3 is an enlarged two dimensional visual representation, indicated generally at 30, that can be generated by the apparatus illustrated in FIG. 2 of the single relatively small area of the outer circumferential surface of the shaft 12 illustrated in FIG. 1. FIG. 4 is an enlarged three dimensional visual representation, indicated generally at 31, that can be generated by the apparatus illustrated in FIG. 2 of the single relatively small area of the outer circumferential surface of the shaft illustrated in FIG. 1. As shown therein, the enlarged visual representations 30 and 31 are preferably shaded, colored, or otherwise highlighted to illustrate the irregularities that are formed in the outer circumferential surface of the shaft 12. For example, such irregularities can be characterized as small peaks and valleys relative to the nominal outer diameter of the shaft 12. Thus, such peaks and valleys can be characterized as having heights that differ relative to the nominal outer diameter of the shaft 12. The magnitude of these different heights (which were obtained using the above-mentioned quantitative analysis) can be represented by differing shades of gray, differing colors, or any other desired designation in the enlarged visual representations 30 and 31.

An analysis of the enlarged visual representations 30 and 31 is then performed to determine whether the illustrated irregularities create a preferential lead when the shaft 12 is rotated during use and, if so, in which direction such preferential lead is oriented. Such analysis may be performed manually by an operator merely by viewing such enlarged visual representations 30 and 31. Alternatively, such analysis may be performed semi-automatically or fully automatically by an electronic computing apparatus that has been programmed with a predetermined algorithm. The analysis may be quantitative in nature (such as based upon the mathematical representations described above) or qualitative in nature (such as based upon the visual representations described above). Such computer hardware and software is commercially available from the Wyko Optical Profilers Group of Veeco Instruments Inc. in Tucson, Ariz.

Although the enlarged visual representations 30 and 31 do illustrate the irregularities formed in the outer circumferential surface of the shaft 12, the physical size of the illustrated surface area is, in both instances, relatively small. Typically, the physical size of the surface area illustrated in the enlarged visual representations 30 and 31 is only approximately 0.04 inch by approximately 0.04 inch. In some instances, it may be possible to detect the presence of a preferential lead in the outer circumferential surface of the shaft 12 from the relatively small visual representations 30 and 31. However, more often, the physical size of the surface area illustrated in the enlarged visual representations 30 and 31 is too small to accurately determine whether the outer circumferential surface of the shaft 12 possesses a preferential lead and, if so, in which direction such preferential lead is oriented.

Figure 5:
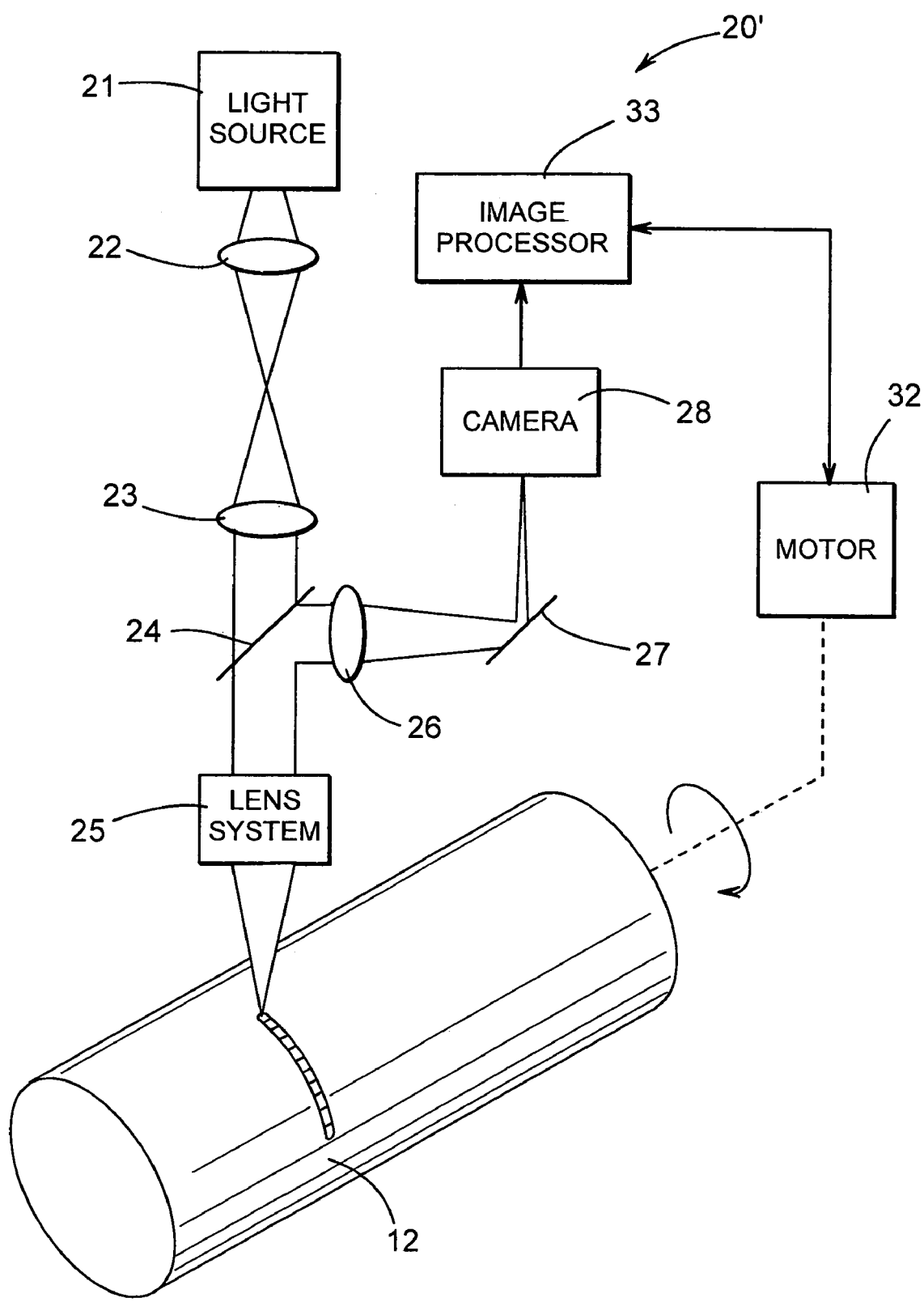
FIG. 5 is a schematic diagram of a second embodiment of an apparatus for generating an enlarged visual representation of a comprehensive relatively large area of the outer circumferential surface of the shaft illustrated in FIG. 1.

To address this, this invention contemplates that a plurality of such enlarged visual representations 30 and 31 be generated to illustrate the irregularities that are formed in a relatively large surface area of the outer circumferential surface of the shaft 12. To accomplish this, a second embodiment of an apparatus, such as indicated generally at 20' in FIG. 5, can be used. The components of the illustrated apparatus 20' are, in large measure, the same as the components of the apparatus 20 illustrated FIG. 2, and like reference numbers are used to illustrate similar components. However, the apparatus 20' further includes a precision motor 32 or other mechanism for selectively re-positioning the shaft 12 in the manner described in further detail below relative to the remainder of the apparatus 20'. The apparatus 20' also includes an image processor 33 that receives signals from the camera 28 to generate enhanced visual representations in the manner also described in further detail below.

As mentioned above, the camera 28 generates a visual representation, typically in digital signal form, of the illuminated area of the outer circumferential surface of the shaft 12. Once a first visual representation of a first illuminated area of the shaft 12 has been acquired by the image processor 33, the motor 32 is energized to rotate or otherwise move the shaft 12 by a predetermined amount. The motor 32 can be energized manually by an operator. Alternatively, as shown by the connection between the motor 32 and the image processor 33, the motor 32 can be energized automatically to rotate or otherwise move the shaft when the image processor 33 has completed its acquisition of the current visual representation. Preferably, the shaft 12 is rotated relative to the apparatus 20' with little or no axial movement of the shaft 12. The amount of such rotation is preferably dependent upon the physical size of the image acquired by the image processor. Preferably, the shaft 12 is rotated by such an amount that the beam of light from the light source 21 is focused on a second illuminated area of the outer circumferential surface of the shaft 12 adjacent to the first illuminated area. For reasons that will be explained below, it may be desirable for the second illuminated area to overlap a relatively small portion of the first illuminated area. Once the shaft 12 has been properly re-positioned in this manner, a second visual representation of the second illuminated area of the shaft 12 is acquired by the image processor 33. This process is repeated as necessary to obtain a plurality of visual representations that, together as a group, span across a predetermined amount of the outer circumferential surface of the shaft 12.

Figures 6, 7:
FIG. 6 is an enlarged two dimensional visual representation generated by the apparatus illustrated in FIG. 5 of the single comprehensive enlarged visual representation of a relatively large surface area of the outer circumferential surface of the shaft illustrated in FIG. 5.
FIG. 7 is an enlarged three dimensional visual representation generated by the apparatus illustrated in FIG. 5 of the single comprehensive enlarged visual representation of a relatively large surface area of the outer circumferential surface of the shaft illustrated in FIG. 5.

Following each acquisition, the visual representations generated by the camera 28 can be stored in a conventional electronic controller (not shown). Then, the plurality of visual representations are processed by the image processor 33 so as to generate a single comprehensive enlarged visual representation of a relatively large surface area of the outer circumferential surface of the shaft 12. Samples of the comprehensive enlarged visual representation that can be generated by the apparatus 20' are illustrated in FIGS. 6 and 7. FIG. 6 is an enlarged two dimensional visual representation, indicated generally at 36, that can be generated by the apparatus illustrated in FIG. 5 of the single comprehensive enlarged visual representation of a relatively large surface area of the outer circumferential surface of the shaft 12 illustrated in FIG. 5. FIG. 7 is an enlarged three dimensional visual representation, indicated generally at 37, that can be generated by the apparatus illustrated in FIG. 5 of the single comprehensive enlarged visual representation of a relatively large surface area of the outer circumferential surface of the shaft 12 illustrated in FIG. 5. As shown therein, the enlarged visual representations 36 and 37 are preferably shaded, colored, or otherwise highlighted to illustrate the irregularities that are formed in the relatively large surface area of the outer circumferential surface of the shaft 12. As described above, such irregularities can be characterized as small peaks and valleys relative to the nominal outer diameter of the shaft 12. Thus, such peaks and valleys can be characterized as having heights that differ relative to the nominal outer diameter of the shaft 12. The magnitude of these different heights can be represented by differing shades of gray, differing colors, or any other desired designation in the enlarged visual representations 36 and 37.

The processing of the plurality of visual representations to generate the single comprehensive enlarged visual representation of a relatively large surface area of the outer circumferential surface of the shaft 12 can be accomplished using known image processing techniques. Preferably, the image processor 33 includes an electronic controller that is programmed to accomplish this task. Such hardware and software is commercially available from the Wyko Optical Profilers Group of Veeco Instruments Inc. in Tucson, Ariz. As mentioned above, it has been found to be desirable that the sequentially acquired illuminated areas to overlap one another by at least a relatively small portion. Such overlapping facilitates the processing of the plurality of visual representations to generate the single comprehensive enlarged visual representation of a relatively large surface area of the outer circumferential surface of the shaft 12.

As mentioned above, the acquisition process is repeated as necessary to obtain a plurality of visual representations that together span across a predetermined amount of the outer circumferential surface of the shaft 12. The size of this circumferential span may be selected as desired to insure that a sufficient amount of the outer circumferential surface of the shaft 12 is sampled to enable a determination of the magnitude and orientation of the preferential lead (if any) formed therein. The size of this measurement will depend, among other things, on the angle measured in each acquisition and the radius of the shaft 12. For example, a circumferential span of approximately fifteen degrees has been found to function satisfactorily.

The axial width of each measurement may also be varied as desired. It has been found to be desirable for each measurement to be at least 0.04 inch in axial width. If desired, the acquisition process can be performed to acquire visual representations in the axial direction, either in combination with or in lieu of the visual representations in the circumferential direction.

The relatively small visual representations 30 and 31 and the comprehensive visual representations 36 and 37 illustrate a combination of both relatively large irregularities and relatively small irregularities that are formed in the outer circumferential surface of the shaft 12. The relatively large irregularities have been found to be the result of preliminary machining operations, such as turning, performed on the shaft 12 at or near the beginning of the manufacturing process. Such relatively large irregularities have been found to make a large contribution toward the presence of a preferential lead on the shaft 12. The relatively small irregularities, on the other hand, have been found be the result of subsequent finishing operations, such as grinding, performed on the shaft 12 at or near the conclusion of the manufacturing process. Such relatively small irregularities have been found to make a small contribution, if any, toward the presence of a preferential lead on the shaft 12.

Thus, to facilitate the analysis of the relatively small visual representations 30 and 31 and the comprehensive visual representations 36 and 37, it may be desirable to employ a digital low pass filter (not shown) to remove the shorter wavelength features from the relatively small visual representations 30 and 31 and the comprehensive visual representations 36 and 37. Such a digital low pass filter is conventional in the art and is designed to remove shorter wavelength features that do not contribute, at least significantly, toward the presence of a preferential lead on the shaft 12. By removing such shorter wavelength features from the relatively small visual representations 30 and 31 and the comprehensive visual representations 36 and 37, the analysis of the remaining larger wavelength features is facilitated.

The shaft 12 is typically manufactured by performing a series of metal working processing steps on a blank of raw metal stock. For example, a blank of raw metal stock may be subjected to a rough turning process, a finish turning process, a quenching process, and a finish plunge grinding process to form the final shaft 12. It will be appreciated that these four processing steps are intended to be representative of any desired number or type of metal working or other processes that can be performed on the shaft 12. It will further be appreciated that each of these processes can create irregularities in the outer circumferential surface of the shaft 12. To improve the overall manufacturing process, a visual representation can be made of a portion of the outer circumferential surface of the shaft 12 after the performance of some or all of the processing steps. By analyzing such visual representations, a determination be made as to whether a preferential lead is present on the outer circumferential surface of the shaft 12 and, if so, what the orientation of such preferential lead is. Additionally, however, by comparing such visual representations, an analysis can be made of the overall manufacturing process. Specifically, it can be determined at which point in the manufacturing process that the preferential lead is being generated and, in some instances, how to prevent or minimize the size thereof.

FIGS. 8 through 11 illustrate comprehensive visual representations of the outer surface of the shaft 12 at the conclusion of four processing steps in the manufacture thereof. FIG. 8 is a comprehensive visual representation of the shaft 12 after being subjected to a first rough turning process. FIG. 9 is a comprehensive visual representation of the shaft 12 after being subjected to a second finish turning process. FIG. 10 is a comprehensive visual representation of the shaft 12 after being subjected to a third quenching process. FIG. 11 is a comprehensive visual representation of the shaft 12 after being subjected to a fourth finish plunge grinding process. As shown by the bracketed portions in FIGS. 9, 10, 11, the preferential lead formed in the outer circumferential surface of the illustrated shaft 12 after being subjected to the second finish turning process possesses the same lead angle and lateral distance between adjacent lowered areas as it does after the fourth plunge grinding process. This similarity indicates that an insufficient allowance for grind lock was made in the fourth finish plunge grinding process. Furthermore, the portion of the comprehensive visual representation of the shaft 12 after being subjected to a fourth finish plunge grinding process highlighted by the arrow in FIG. 11 represents a recessed area on the shaft 12 that could result in chattering on the surface of the shaft 12 during use. Thus, it can be seen that an analysis of the visual representations made at differing points of the manufacture of the shaft 12 can allow a determination be made as to whether the overall manufacturing process is satisfactory or should be changed to enhance the quality of the outer circumferential surface of the final shaft 12.

The invention has been described in the context of the cylindrical, rotatable shaft 12 that is adapted for use with the seal assembly 10 illustrated in FIG. 1 to determine the presence and orientation of a preferential lead. However, it will be appreciated that this invention may be used to generate a visual representation of any desired surface of any desired article for any desired purpose. For example, either the apparatus 20 or the apparatus 20' described above may be used to generate visual representations of the surfaces of a gear to analyze and reduce the effects of wear thereon during use.

Figure 12:
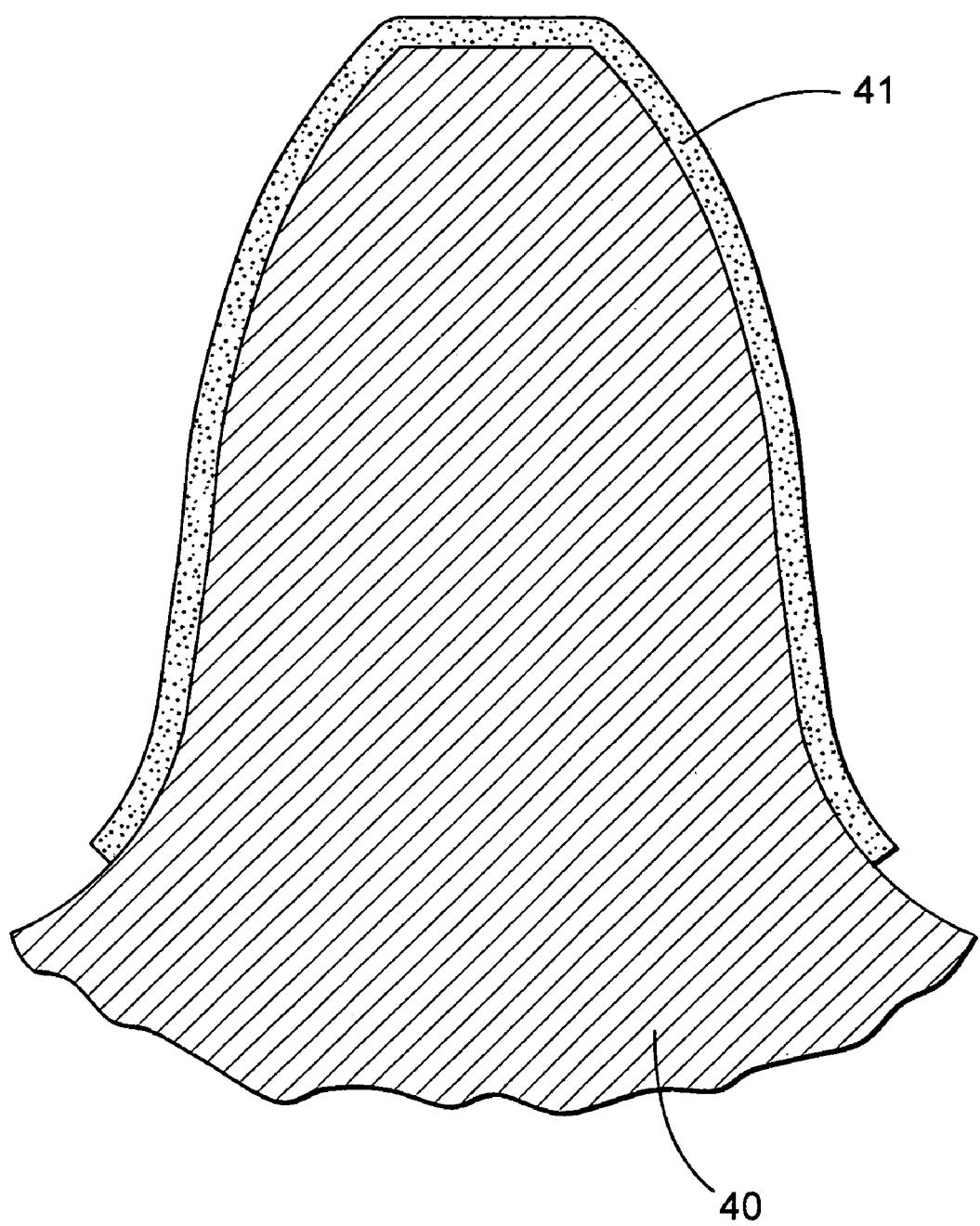
FIG. 12 is an enlarged sectional elevational view of a tooth of a gear having a layer of a film applied thereto.

FIG. 12 is an enlarged sectional elevational view of a tooth 40 of a conventional gear. The tooth 40 is intended to be representative of any mechanical structure having a surface that is desired to be analyzed in the manner described above. In the illustrated embodiment, it will be appreciated that the configuration of the outer surface of the tooth 40 of the gear is quite irregular in shape in comparison to the cylindrical shaft 12 discussed above. In instances such as this, the use of the apparatus 20 or 20' may be somewhat awkward because of the non-flat or circular shape of the outer surface of the article to be illuminated and analyzed.

Figure 13:
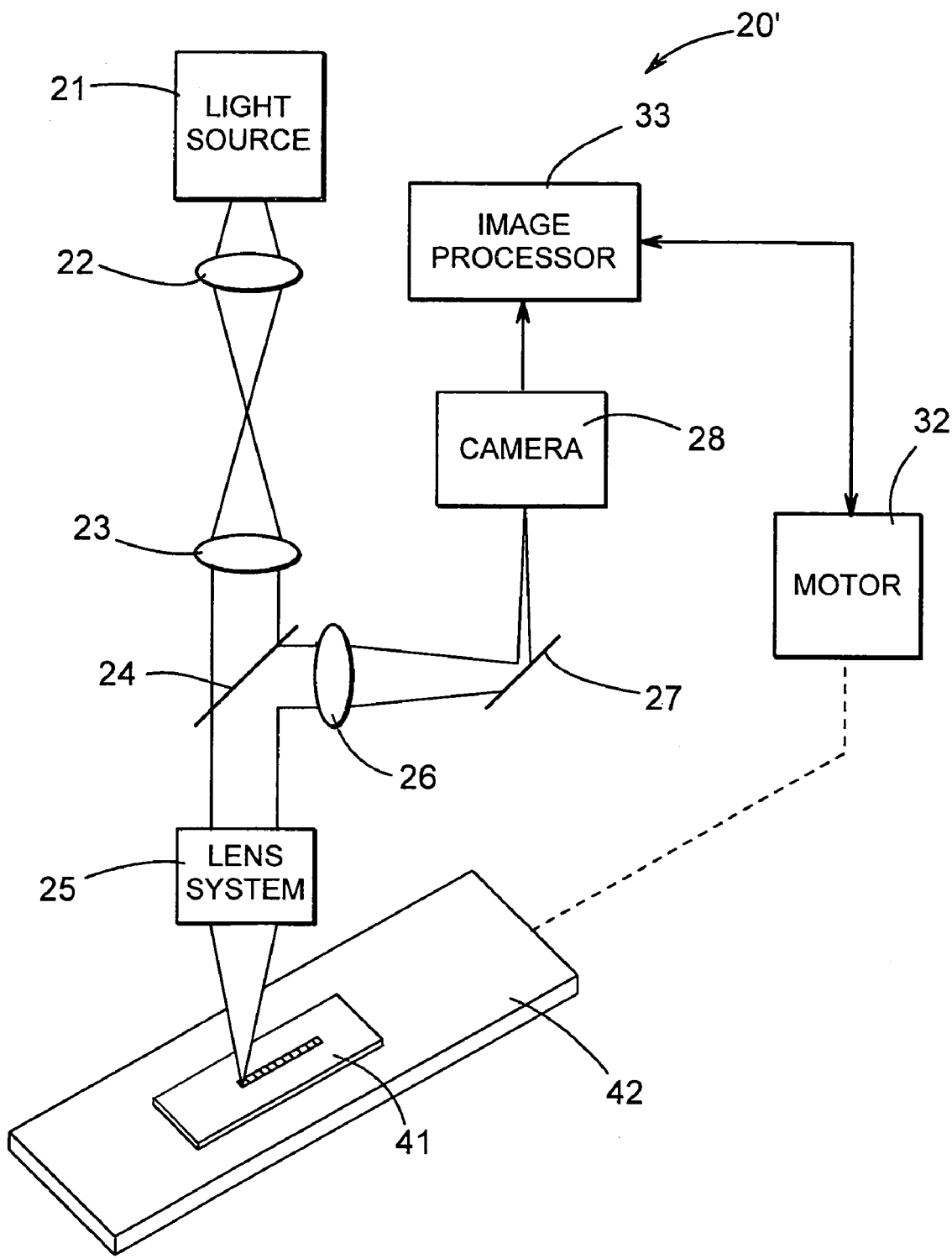
FIG. 13 is a schematic diagram of the apparatus illustrated in FIG. 5 for generating an enlarged visual representation of a comprehensive relatively large area of the outer surface of the gear illustrated in FIG. 12.

In order to facilitate the use of the apparatus 20 or 20', a film 41 is applied to or otherwise contacted with the portion or portions of the outer surface of the tooth 40 to be illuminated and analyzed. Such film 41 is preferably formed from a material that is somewhat flexible so that when it is applied to the outer surface of the tooth 40 of the gear, it conforms its shape to the shape of the outer surface of such tooth 40. Thus, when it is applied to such outer surface, the film 41 is deformed to acquire the same or similar surface characteristics as the portion of the outer surface of the tooth 40 of the gear to be illuminated and analyzed. Ideally, the film 41 will be deformed to acquire the same surface characteristics (albeit in reverse, wherein peaks on the outer surface of the tooth 40 form correspondingly shaped valleys in the surface of the film 41, and wherein valleys in the outer surface of the tooth 40 form correspondingly shaped peaks on the surface of the film 41) as the portion of the outer surface of the tooth 40 of the gear to be illuminated and analyzed. Then, the film 41 is removed from the tooth 40 of the gear and laid flat, such as on a support surface 42 shown in FIG. 13 if desired. Thereafter, the apparatus 20 or 20' may be used in the manner described above to generate one or more visual representations of the deformed portions thereof. The analysis of such visual representations can be made in the manner described above to provide a determination of the outer surface of the tooth 40 of the gear.

It will be appreciated that the film 41 is intended to be representative of any desired material that can be used to acquire a replica having the same or similar surface characteristics as the portion of the outer surface of the tooth 40 of the gear to be illuminated and analyzed, which replica can subsequently be re-shaped to facilitate the use of the apparatus 20 or 20'. For example, the replicating media may include putty and clay materials, elastomeric materials, silicone based resins, and similar materials that are sufficiently dimensionally stable to form a solid impression of the portion of the outer surface of the tooth 40 of the gear to be illuminated and analyzed.

As mentioned above, to improve the characterization of the surface of an article, it is known to initially measure the size and orientation of the irregularities formed therein, such as in the manner described above, then to perform one or more mathematical operations to derive a parameter that is indicative of such irregularities. Most known surface parameters have been developed to mathematically describe the surface of the article, as opposed to relating the texture of the surface of the article to the function thereof during use. This invention contemplates a method of deriving a new parameter that is indicative of the relationship of the texture of the surface of the article to the function thereof during use. This parameter, which will be referred to herein as the surface capacity (SC) parameter, can be used, for example, to optimize the selection of different machining processes used to form one or more of the components of the mechanical structure, such as the shaft 12 described above.

To accomplish this, the surface capacity (SC) parameter of this invention combines and relates information relating to the volume of the material that is contained in the peaks on the surface of the article (preferably only in the relevant space or area of interest thereon) with the volume of the space in the surface of the article that is available for the retention of a fluid, such as a lubricant (again, preferably only in the relevant space or area of interest thereon). This relationship can be expressed as a ratio, and the surface capacity (SC) parameter of this invention represents the ratio of the volume of the material that is contained in the peaks formed on the surface of the article to the volume of the space in the surface of the article that is available for the retention of a fluid, such as a lubricant. Because of the varying operational requirements imposed upon the components of the mechanical structure during use, different threshold levels can be use to identify the relevant peak material and the relevant volume of available space for lubricant for different applications. The use of different threshold levels to identify the relevant peak material and the relevant volume of space available for lubricant will be described further below.

Figure 14:
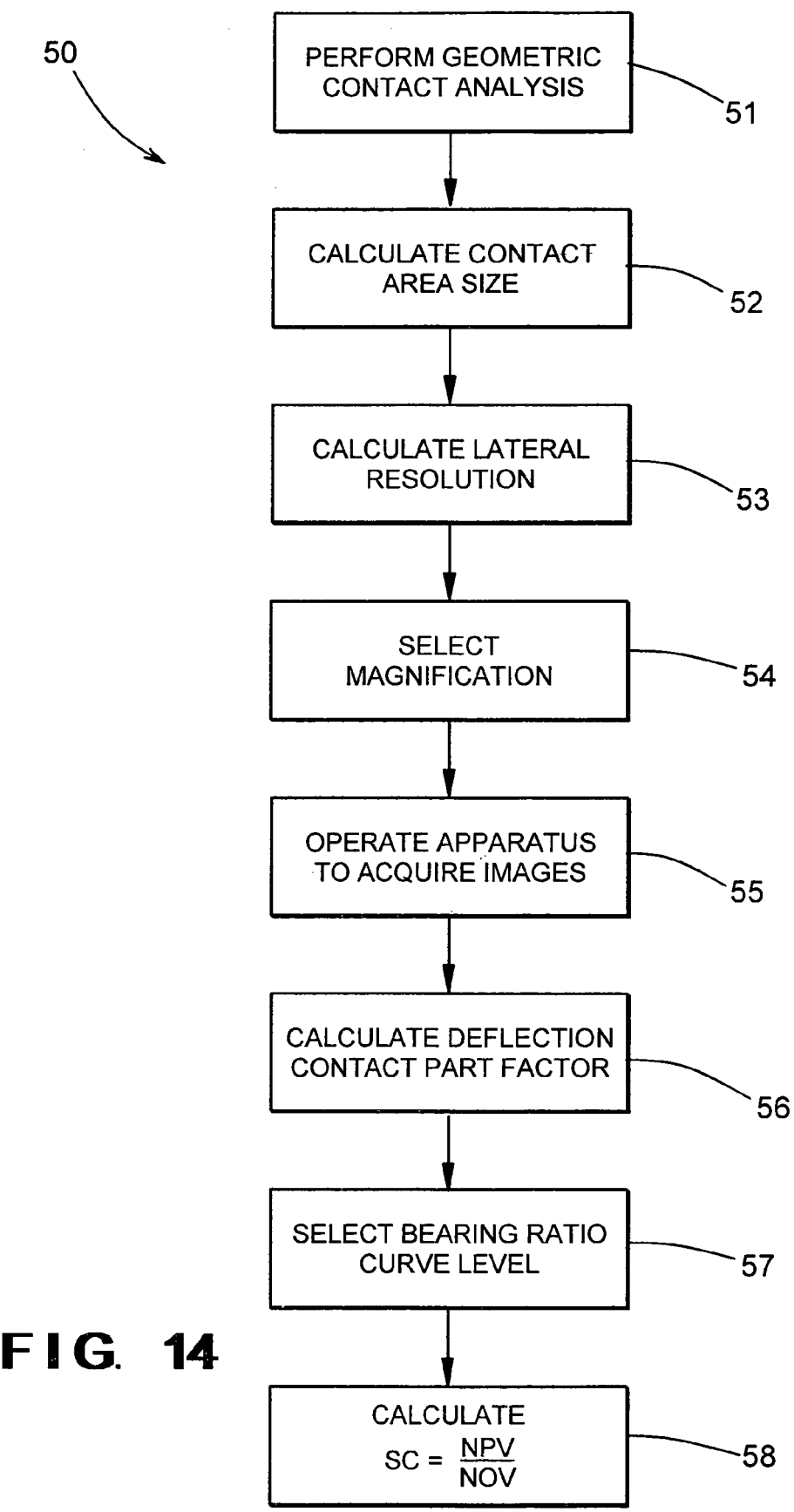
FIG. 14 is a flowchart of a method of calculating the surface capacity parameter in accordance with this invention.

FIG. 14 is a flowchart of a method, indicated generally at 50, of determining the value of the surface capacity (SC) parameter in accordance with this invention. As shown therein, in a first step 51 of the method 50, a geometric contact analysis is initially performed. The geometric contact analysis step 51 is performed to determine an area of interest on the surface of the article to be measured (such as by using the apparatus and method described above) that can be subsequently analyzed and characterized in the manner described below. By defining the proper area of interest on the surface of the article for this measurement, analysis, and characterization, the geometric contact analysis step 51 thus avoids any measurement, analysis, and characterization of portions of the surface of the article that are redundant or otherwise unnecessary for the purposes of this invention. The determination of the size, shape, and location of the area of interest on the surface of the article to be measured will depend upon a variety of application-specific factors. For example, the geometric contact analysis can account for the specific geometric structure of the engaging portions of the components of the mechanical structure, the nature of the materials used to form the components of the mechanical structure, the manner of engagement of the components of the mechanical structure, the magnitude of the load applied by and to the components of the mechanical structure, and other engineering considerations. It is contemplated that any other factor can be used to assist in the performance of the geometric contact analysis step 51.

In a second step 52 of the method 50, the contact area size of the area of interest on the surface of the article is calculated or otherwise determined. In other words, the physical size of the area of interest on the surface of the article is determined in response to the previously performed geometric contact analysis step 51. As described above, the contact area size of the area of interest on the surface of the article will vary from application to application. For example, in a radial lip seal assembly application such as described above, the contact area size of the area of interest on the surface of the shaft 12 can be relatively small, such as approximately 0.2 mm by 0.2 mm. This is because the physical size of the area of contact between the sealing element 16 and the outer circumferential surface of the shaft 12 is relatively small. However, in a universal joint cross assembly including a hollow cylindrical bearing cup that is rotatably supported on a cylindrical trunnion by a plurality of cylindrical roller bearings, the contact area size of the area of interest on the surface of the article can be relatively large, such as approximately 3.0 mm by 3.0 mm. This is because the physical size of the area of contact between the hollow cylindrical bearing cup and the surface of the trunnion is relatively large. Thus, it will be appreciated that the contact area size of the area of interest on the surface of the article will vary from application to application. When calculating the contact area size of the area of interest on the surface of the article, it has been found to be desirable to include a portion of the surface of the article that is not engaged during use to provide a reference surface that can facilitate subsequent analysis.

In a third step 53 of the method 50, the lateral resolution of the contact area size of the area of interest on the surface of the article is calculated or otherwise determined. The lateral resolution determination step 53 is performed to determine how closely the area of interest on the surface of the article should be measured (such as by using the apparatus and method described above) for subsequent analysis and characterization in the manner described below. By properly defining the lateral resolution for the area of interest, those features on the surface of the article that have a significant impact on the functionality of the engaging portions of the components of the mechanical structure will be measured, analyzed, and characterized. Conversely, those features on the surface of the article that do not have a significant impact on the functionality of the engaging portions of the components of the mechanical structure will not be measured, analyzed, and characterized. The lateral resolution determination step 53 thus avoids any measurement, analysis, and characterization of portions of the surface of the article that do not have a significant impact on the functionality of the engaging portions of the components of the mechanical structure. The determination of the lateral resolution will depend upon a variety of application-specific factors. For example, the lateral resolution determination can account for the specific geometric structure of the engaging portions of the components of the mechanical structure, the nature of the materials used to form the components of the mechanical structure, the manner of engagement of the components of the mechanical structure, the magnitude of the load applied by and to the components of the mechanical structure, and other engineering considerations. Also, the lateral resolution determination can account for the relative concentration or density of the features of the texture of the surface of the article (i.e., the peaks and valleys formed on such surface) and with reference to the specific parameters of the contact mechanics discussed above, including material composition, manner of engagement, load magnitude, and other engineering considerations. Thus, in part, the lateral resolution of the contact area is preferably related to the relative spacing between the various features on the surface of the article, not to the amplitudes or sizes thereof. For example, if a relatively large quantity of features are present within a contact area of a given size, then the desired lateral resolution can be determined to be somewhat greater than if a relatively small quantity of features are present within a contact area of the same size. A greater lateral resolution indicates that a larger number of detailed images will be necessary or desirable to properly measure the contact area of interest on the surface of the article. Conversely, a lesser lateral resolution indicates that a smaller number of detailed images will be necessary or desirable to properly measure the same contact area of interest on the surface of the article. It is contemplated that any other factor can be used to assist in the performance of the lateral resolution determination step 53.

In a fourth step 54 of the method 50, a magnification factor is selected for the apparatus, such as the apparatus 20 described above, for generating the visual representation of the surface of the article. Typically, the apparatus 20 has a variable magnification factor that determines the physical size of the single relatively small area of the surface of the article that is measured in the manner described above. For example, when selected for operation with a magnification factor of five, the interferometric measuring device described above can measure a physical area on the surface of the article of about 1.2 mm by about 0.9 mm. To optimize the efficiency of the method of this invention, the magnification factor of the apparatus 20 is selected in accordance with the lateral resolution as set forth above. Generally speaking, the magnification factor of the apparatus 20 will vary directly with the lateral resolution. In other words, as the lateral resolution increases, the magnification factor of the apparatus 20 will increase, and vice versa. The magnification factor of the apparatus 20 can also be selected in accordance with the contact area size of the surface of the article as set forth above.

In a fifth step 55 of the method 50, the apparatus 20 is operated as described above to generate a visual representation of the surface of the article. This step is preferably performed after the contact area of interest on the surface of the article and after the magnification factor of the apparatus 20 have been determined. As discussed above, the apparatus 20 can be operated to generate either an enlarged visual representation of a single relatively small area of the outer circumferential surface of the shaft 12 or a single comprehensive enlarged visual representation of a relatively large surface area of the outer circumferential surface of the shaft 12. This can be done in the manner described above.

In a sixth step 56 of the method 50, a deflection contact part factor is calculated. It is known that when two components engage each other during use, one or both of such components will be deflected relative to the other. The amount of such deflection will vary from application to application in accordance with a variety of factors, such as the geometry of the components, maximum and minimum loads, contact area, average surface roughness, elasticity of the contact surfaces, and the like. Several standard formulas are known in the art for making this deflection contact part factor calculation. The deflection contact part factor calculation is made to facilitate the determination of the relevant region of interest in the surface of the article when calculating the surface capacity (SC) parameter of this invention. As mentioned above, the surface capacity (SC) parameter of this invention combines information relating to the volume of the material comprising the peaks in the surface of the article (preferably only in the relevant space of interest) with the volume of the space comprising the valleys in the surface of the article that is available for the retention of a fluid, such as a lubricant. As will be described in detail below, the relevant region of interest in the surface of the article will vary directly with the amount of deflection that the component experiences during use. In other words, as the amount of deflection experienced by the component during use increases, the volume of the relevant region of interest in the surface of the article will increase, and vice versa.

In a seventh step 57 of the method 50, a bearing ratio curve level is selected. The bearing ratio curve level is a function of the deflection part contact factor calculated above in step 56 and the magnitude of the height or distance between the tallest peak and the lowest valley on the surface of the article. The object of the bearing ratio curve level selection is to facilitate a determination of the region of interest that that is relevant to the particular components of the mechanical structure for subsequent analysis. Starting from the highest point of the surface, a percentage of measured surface is established that comprises the expected peaks of the surface. For example, one may take the top (based on height) 1% of all data points measured as a definition of the peak area most likely to be involved with supporting the seal surface. The establishment of the percentage may depend on a variety of factors. For example, if the component to be measured has a relatively low calculated deflection, then the region of interest will be relatively small. Conversely, if the component to be measured has a relatively high calculated deflection, then the region of interest will be relatively large. The bearing ratio curve level can be expressed as a percentage of the height or distance between the tallest peak and the lowest valley on the surface of the article.

Figure 15:
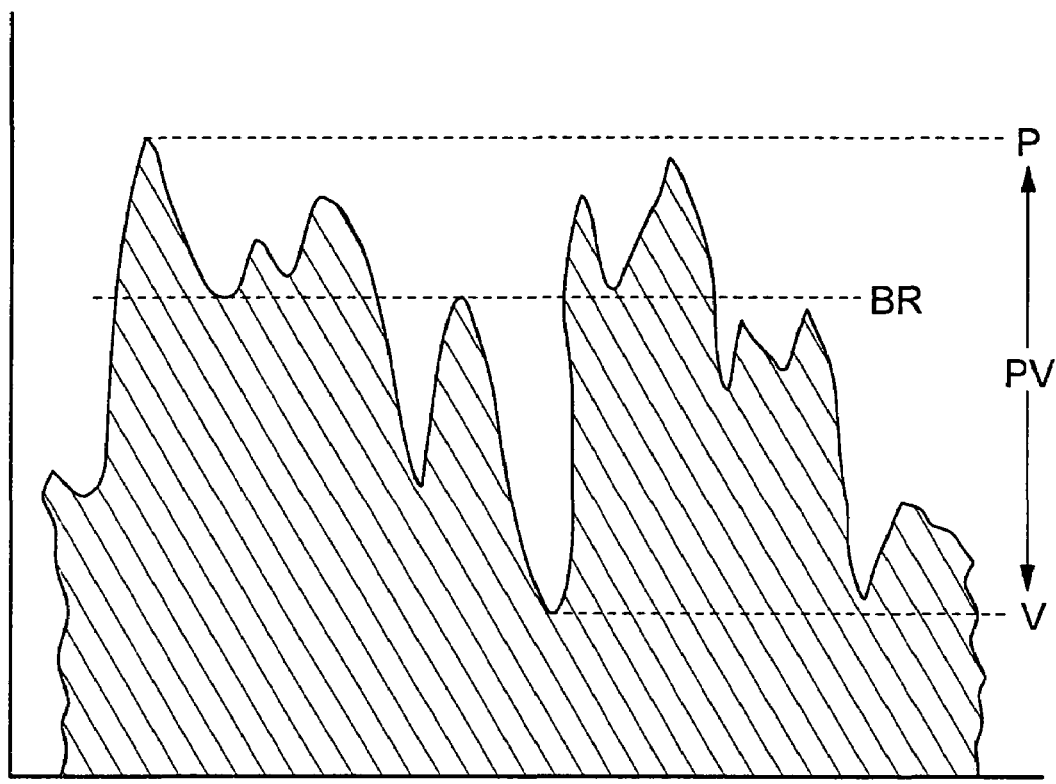
FIG. 15 is a graph that illustrates in two dimensional form the irregularities present on a portion of the surface of an article and a single bearing ratio curve level line that represents a single threshold for calculating the surface capacity parameter.

For example, in FIG. 15 is a graph that illustrates in two dimensional form the features or irregularities present on a portion of the surface of an article. Such features or irregularities are presented as a series of peaks and valley that are formed on the surface of an article, such as during the manufacture thereof, relative to a reference point or location. The highest peak on the surface of the article is identified as P and can represent the farthest location from which any portion of the surface of the article being studied extends from a reference point (such as the central axis of the shaft 12). Similarly, the lowest valley on the surface of the article is identified as V and can represents the nearest location from which any portion of the surface of the article being studied extends from the same reference point. The height or distance between the highest peak P and the lowest valley V (which is radially extending, using the example of the shaft 12) is identified as PV. The reference line or plane is preferably placed as to not be heavily influenced by the presence of one large peak structure.

As discussed above, the region of interest of the component of the mechanical structure that is relevant for analysis (i.e., the bearing ratio curve level) is dependent upon the amount of the calculated deflection of the component during use. Thus, if the component to be measured has a relatively low calculated deflection, then the region of interest will be relatively small, and vice versa. The bearing ratio curve level can be calculated as the ratio of the deflection contact part factor (calculated in step 56) to the height or distance between the highest peak P and the lowest valley V (which is PV). This ratio can be calculated as a percentage of the PV height or distance and is illustrated on the graph in FIG. 15 as a single line BR. In the illustrated embodiment, the calculated ratio is approximately one-third, so the line BR is located on the graph in FIG. 15 approximately 33% of the distance from the highest peak P toward the lowest valley V. In some instances, the calculated deflection contact part factor will be greater than the PV height or distance. In those instance, the bearing ratio curve level will be 100%, and the line BR will be co-extensive with the lowest valley V. The line BR on the two dimensional graph illustrated in FIG. 15 is representative of a plane that can be placed on a three dimensional representation (such as shown in FIG. 7) of the surface of the article.

In an eighth step 58 of the method 50, the surface capacity (SC) parameter is calculated. As discussed above, the surface capacity (SC) parameter of this invention combines information relating to the volume of the material comprising the peaks in the surface of the article (preferably only in the relevant space of interest) with the volume of the space comprising the valleys in the surface of the article that is available for the retention of a fluid, such as a lubricant. This can be expressed as a ratio, wherein the surface capacity (SC) parameter represents the ratio of the volume of the material comprising the peaks in the surface of the article (preferably only in the relevant space of interest) with the volume of the space comprising the valleys in the surface of the article that is available for the retention of a fluid, such as a lubricant, or

SC=NPV/NOV wherein NPV represents the volume of the material comprising the peaks in the surface of the article and NOV represents volume of the space comprising the valleys in the surface of the article.

The volume of the material comprising the peaks in the surface of the article (NPV) can be determined after the bearing ratio curve level is established using computer software. For example, the computer software can evaluate volume of the material comprising the peaks in the surface of the article above the BR reference line in FIG. 15. The absolute volume of such material can be expressed in units of volume, such as in cubic micrometers. The volume of the space comprising the valleys in the surface of the article (NOV) can also be determined after the bearing ratio curve level is established using computer software. For example, the computer software can evaluate the volume of the space comprising the valleys in the surface of the article below the BR reference line in FIG. 15. The absolute volume of such space can also be expressed in units of volume, such as in cubic micrometers. The surface capacity parameter SC can then be calculated as the ratio of those two volumes.

As mentioned above, different threshold levels can be used to identify the relevant peak material and the relevant available space for lubricant. An example of this is shown in FIG. 16, which illustrates in two dimensional form the features or irregularities present on a portion of the surface of an article and a pair of bearing ratio curve level lines $BR_U$ and $BR_L$ that represent upper and lower thresholds for calculating the surface capacity (SC) parameter. The volume of the material comprising the peaks in the surface of the article (NPV) can be determined after the upper bearing ratio curve level is established using computer software. For example, the computer software can evaluate the volume of the material comprising the peaks in the surface of the article above the $BR_U$ reference line in FIG. 16. The absolute volume of such material can be expressed in units of volume, such as in cubic micrometers. The volume of the space comprising the valleys in the surface of the article that is available for lubricant retention (NOV) can be determined after the lower bearing ratio curve level is established using computer software. For example, the computer software can evaluate the volume of the space comprising the valleys in the surface of the article below the BRL reference line in FIG. 16. The absolute volume of such space can also be expressed in units of volume, such as in cubic micrometers. The desirability of using of differing bearing ratio curve level lines $BR_U$ and $BR_L$ that represent upper and lower thresholds for calculating the surface capacity (SC) parameter will depend upon the particular application. For example, in a lubricant-starved environment, the volume of the space comprising the valleys in the surface of the article that is available for lubricant retention will be somewhat greater than the volume of the lubricant that is actually present. In such a situation, the volume of the space comprising the valleys in the surface of the article that is available for lubricant retention (NOV) is not representative of the actual volume of the lubricant that is actually present. Thus, the use of a pair of bearing ratio curve level lines $BR_U$ and $BR_L$ can, at least in some instances, provide a more useful calculation of the surface capacity (SC) parameter.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of determining a surface capacity parameter for a surface of an article having irregularities therein characterized by peaks and valleys relative to a threshold level, said method comprising the steps of:
   (a) determining a threshold level that is indicative of a region of interest on the surface of the article;
   (b) determining the volume of the material comprising the peaks in the surface of the article above the threshold level;
   (c) determining the volume of the space comprising the valleys in the surface of the article below the threshold level; and
   (d) calculating a surface capacity parameter as the ratio of the volume of the material comprising the peaks in the surface of the article to the volume of the volume of the space comprising the valleys in the surface of the article.

2. A method of determining a surface capacity parameter for a surface of an article having irregularities therein characterized by peaks and valleys, said method comprising the steps of:
   (a) performing a geometric contact analysis to determine an area of interest on the surface of the article to be analyzed;
   (b) determining a contact area size of the area of interest on the surface of the article based upon the geometric contact analysis;
   (c) determining a lateral resolution of the area of interest on the surface of the article;
   (d) selecting a magnification factor for an apparatus for generating a visual representation of a portion of the surface of the article based upon the lateral resolution and the contact area size;
   (e) operating the apparatus to generate a plurality of visual representations of portions of the surface of the article;
   (f) processing the plurality of visual representations to generate a single comprehensive enlarged visual representation of the area of interest on the surface of the article;
   (g) calculating a deflection contact part factor for the article;
   (h) determining a bearing ratio curve level based upon the calculated deflection contact part factor and the magnitude of the height or distance between the tallest peak and the lowest valley on the surface of the article;
   (i) determining the volume of the material comprising the peaks in the surface of the article based upon the comprehensive enlarged visual representation of the area of interest on the surface of the article and the bearing ratio curve level;
   (j) determining the volume of the space in the surface of the article that is available for the retention of a fluid, such as a lubricant, based upon the comprehensive enlarged visual representation of the area of interest on the surface of the article and the bearing ratio curve level; and (k) calculating a surface capacity parameter as the ratio of the volume of the material comprising the peaks in the surface of the article to the volume of the volume of the space comprising the valleys in the surface of the article.

3. The method defined in claim 1 wherein said step (a) is performed by determining a bearing ratio curve level for the surface of the article as a function of a deflection part contact factor and the magnitude of the height or distance between the tallest peak and the lowest valley on the surface of the article.

4. The method defined in claim 3 wherein the deflection part contact factor is representative of the amount of deflection that will occur in the article during use.

5. The method defined in claim 1 wherein said step (a) is performed by determining upper and lower threshold levels, said step (b) is performed by determining the volume of the material comprising the peaks in the surface of the article above the upper threshold level, and said step (c) is performed by determining the volume of the space comprising the valleys in the surface of the article below the lower threshold level.

* * * * *